(No Model.) 2 Sheets—Sheet 2.
J. F. SEIBERLING.
SHEAF CARRIER FOR HARVESTERS.
No. 515,370. Patented Feb. 27, 1894.
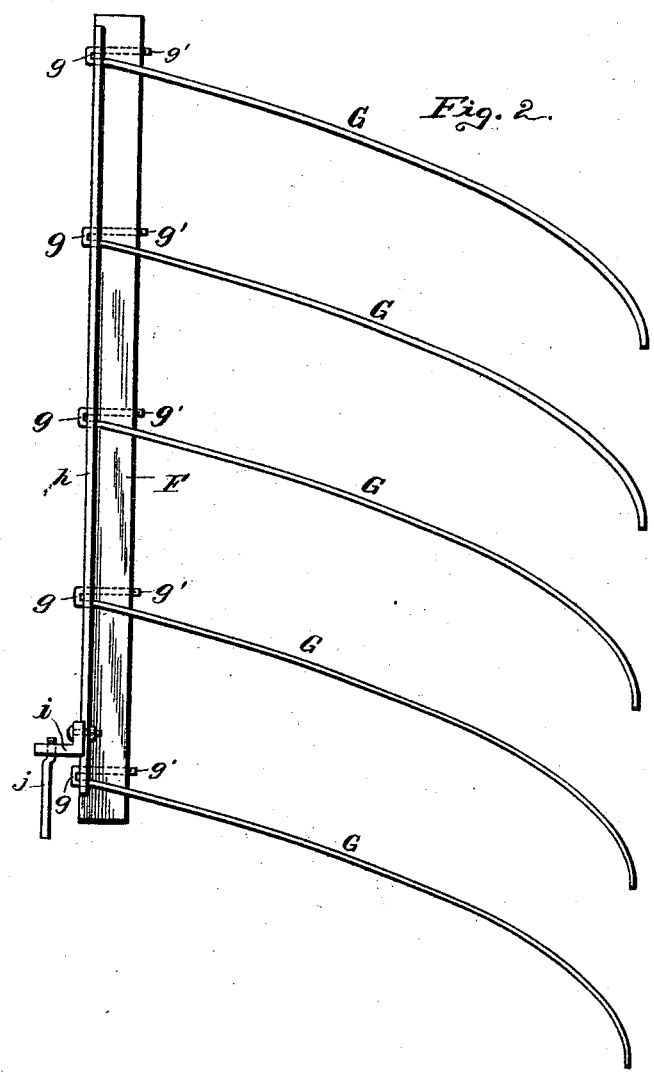
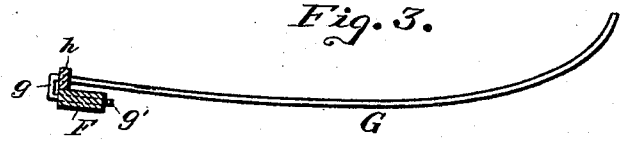
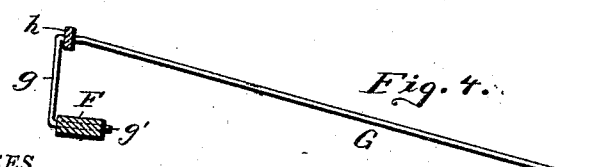
WITNESSES
INVENTOR
John F. Seiberling
By A. M. Smith & Son
Attorneys

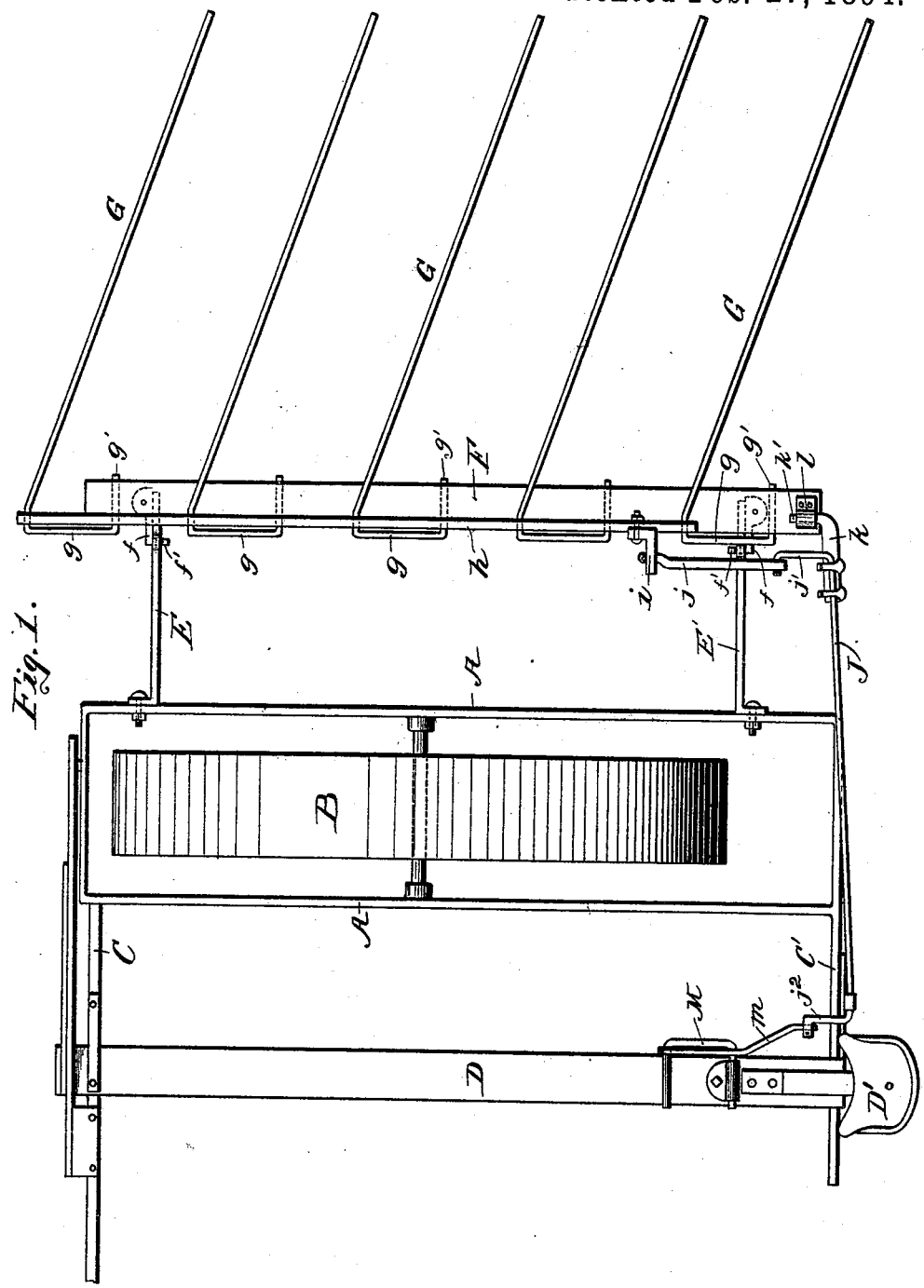

UNITED STATES PATENT OFFICE.

JOHN F. SEIBERLING, OF AKRON, OHIO.

SHEAF-CARRIER FOR HARVESTERS.

SPECIFICATION forming part of Letters Patent No. 515,370, dated February 27, 1894.

Application filed September 2, 1893. Serial No. 484,637. (No model.)

*To all whom it may concern:*

Be it known that I, JOHN F. SEIBERLING, a citizen of the United States, and a resident of Akron, in the county of Summit and State of Ohio, have invented a new and useful Improvement in Sheave-Carriers for Harvesters, of which the following is a full, clear, and exact description, reference being had to the accompanying drawings, making part of this specification.

My invention relates to that class of sheaf carriers employing fingers, pivoted each on an independent axis, but connected to rock or roll together in discharging the bundles; and it consists in a novel arrangement of the fingers relative to their axes, and the crank-arms connecting the fingers with said axes, whereby a rearward inclination is given to the fingers, relative to their axes or pivots, and to the path of the grain to the carrier fingers, both in the position they occupy in receiving the sheaves, and in that which they assume in discharging the same; and whereby, also, in being rocked into the latter position, the heel ends of the fingers are raised, and the points or outer ends thereof, are depressed, as hereinafter described and claimed.

In the accompanying drawings:—Figure 1, is a plan view of so much of a grain harvester as is necessary to show my invention, with the carrier fingers in position to receive the bundles. Fig. 2, is a plan view of the carrier with the fingers rocked into position to discharge the bundles. Fig. 3, represents a vertical transverse section through the carrier of Fig. 1, and Fig. 4, a similar section of Fig. 2.

A indicates the main frame of the machine, B the main carrying and driving wheel thereof, and C, C' transverse bars extending on the grain side of the wheel, and to which the cutting apparatus, endless carriers or grain rake and driver's seat plank D and seat D' are connected in any usual manner.

To the outer or stubble side of the frame A, laterally projecting arms E, E', are rigidly secured, and which may form a support for a binder mechanism mounted thereon, to receive and bind the grain, and discharge the bundles upon the carrier in any usual manner; and to the outer ends of these arms, a longitudinally arranged bar F is secured preferably by hinge plates or straps $f$ secured rigidly to the lower face of the bar F, and provided with arms extending inward by the sides of the arms E, E', and having hinge pins or pivots $f'$ at their inner ends, which pass through eyes or perforations in the arms E, E,' thereby hinging the bar F thereto. The ends of the arms E, E' project underneath the bar F, and form stops for preventing the bar from swinging downward below a horizontal, or the desired position of support for the carrier, but permitting said bar and the carrier fingers connected therewith, to be folded over on the arms E, E' for transportation.

G, G, indicate the carrier fingers curved substantially as indicated in the drawings, so that when in position to receive the bundles, the points or outer ends will extend or curve upward, thereby adapting them to catch and retain the bundles as they come from the binder. These fingers, at or near their inner or heel ends, pass through or engage a longitudinally arranged bar $h$ overlying the bar F; and, inside of said bar, the heel ends of the fingers are bent forward at an angle acute to the body of the finger, to form crank arms $g$, terminating in outwardly turned crank pins $g'$, which are journaled in bearings in the bar F, as shown. The heel ends of the fingers proper, adjacent to the crank arms for a short distance, are parallel with the pins or axes $g'$, thereby facilitating their turning in the bar $h$; but under the construction described, it will be seen that the bodies of the fingers are inclined rearward relative to their axes or crank pins $g'$, so that the latter, extended, would cross the vertical plane of the fingers at or near the center of their length.

The rod or bar $h$ has a bracket $i$, secured to it, near its rear end, with which a rod $j$ is pivotally connected, the other end of said rod or pitman being connected with a crank arm $j'$ on a transverse rock shaft J., mounted in suitable bearings on the frame A, and on an arm $k$ secured to the bar F. To permit the folding movement of the carrier, for transportation, as above described, the arm $k$ is pivoted to the bar F by means of a pin, $k'$ on its outer end, engaging an eye bearing at $l$, on the bar, as shown.

The rock shaft J has a crank arm $j^2$ on its inner end, from which a connecting rod $m$, extends to an upright lever M pivoted to the seat plank D, or other support in the machine, in convenient position to be operated by the driver.

The arrangement of levers and their connection for operating the sheaf carrier may, of course, be any one suitable for the purpose.

With the fingers in position to receive the bundles, as shown in Fig. 1, the bar $h$ is thrown forward and rests on the bar F, the crank arms $g$, extending forward from their pivots $g'$ in a position approximating horizontal, as shown. Now when the bar $h$ is operated upon by the driver through the lever and its connections therewith as described, the heel ends of the fingers will be rocked upward and rearward, through the action of the crank arms, while the outer ends or points of the fingers, owing to the oblique arrangement of the fingers relative to their axes, will be correspondingly depressed thereby causing the fingers to incline downward, as well as rearward, thus permitting the bundles to slide off quickly and easily to the ground. The fingers are restored to position for receiving the bundles by operating them by means of the lever M, through the connections therewith as described, or by any usual arrangement of spring for that purpose.

The sheaf carrier is shown applied to that type of machines in which the grain is carried up over the driving wheel, but it will be obvious that it is equally applicable to other types or constructions of machines.

Having now described my invention, I claim as new—

1. In a sheaf carrier, the combination with a longitudinally arranged bar or support, of the rearwardly inclined fingers each carried by an independent crank arm rocking on a transverse pivot connected with said support, substantially as and for the purpose described.

2. The pivoted and folding sheaf-carrier bar, in combination with the obliquely arranged or rearwardly inclined carrier fingers having crank arms journaled in said bar on transversely arranged pivots, which, extended, would cross the oblique line or vertical plane of the fingers, when the latter are in position to receive the bundles, substantially as described.

3. The rearwardly-inclined, sheaf-carrier fingers, pivoted by crank arms to a longitudinal support on axes or pivots which extended, would cross the vertical plane of the fingers at or near the center of their length when the latter are raised to receive the bundles, substantially as described.

4. The combination in a sheaf carrier of the longitudinally arranged finger-supporting bar, the rearwardly inclined fingers, and the independent crank-arms to which said fingers are attached, said crank arms rocking on outwardly turned or recurved pivots journaled in said bar, substantially as described.

5. The combination in a sheaf carrier, of the pivoted bar F, the obliquely arranged fingers, G carried by crank arms connected to said bar by transversely arranged, horizontal pivots and the connecting rod or bar $h$, for simultaneously rocking said fingers, substantially as described.

6. The longitudinally arranged sheaf-carrier bar F, and rearwardly inclined fingers G, carried upon independent swinging crank arms $g$ connected with said bar, each by a transversely arranged, horizontal pivot in combination with the bar $h$ connected to said fingers, for simultaneously rocking them, and the lever connected to said bar for operating it, substantially as described.

In testimony whereof I have hereunto set my hand this 29th day of August, A. D. 1893.

JNO. F. SEIBERLING.

Witnesses:
B. C. ROSS,
J. P. CURTISS.